US009264939B2

(12) United States Patent
Patti et al.

(10) Patent No.: US 9,264,939 B2
(45) Date of Patent: Feb. 16, 2016

(54) COMMUNICATION OVER A WIRELESS CONNECTION

(75) Inventors: Andrew J. Patti, Cupertino, CA (US); Wai-Tian Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 61 days.

(21) Appl. No.: 14/345,268

(22) PCT Filed: Oct. 7, 2011

(86) PCT No.: PCT/US2011/055223
§ 371 (c)(1),
(2), (4) Date: Mar. 17, 2014

(87) PCT Pub. No.: WO2013/052060
PCT Pub. Date: Apr. 11, 2013

(65) Prior Publication Data
US 2014/0341202 A1    Nov. 20, 2014

(51) Int. Cl.
*H04W 28/06* (2009.01)
*H04L 1/18* (2006.01)

(52) U.S. Cl.
CPC ............. *H04W 28/06* (2013.01); *H04L 1/1867* (2013.01)

(58) Field of Classification Search
CPC .................................................... H04W 28/06
USPC ......... 370/252, 335, 337, 338, 347, 389, 474, 370/236; 455/69; 709/203, 231, 233, 234
See application file for complete search history.

(56) References Cited

U.S. PATENT DOCUMENTS

| 5,151,902 | A  | * | 9/1992  | Grallert ........................ 714/704 |
| 5,905,756 | A  | * | 5/1999  | Lamkin et al. ................ 375/222 |
| 6,357,028 | B1 | * | 3/2002  | Zhu ............................... 714/751 |
| 6,977,888 | B1 | * | 12/2005 | Frenger et al. ................ 370/218 |
| 6,996,083 | B1 | * | 2/2006  | Balachandran et al. ...... 370/337 |
| 7,016,971 | B1 | * | 3/2006  | Recio et al. ................... 709/233 |
| 7,096,400 | B2 | * | 8/2006  | Lim et al. ...................... 714/748 |
| 7,443,797 | B2 | * | 10/2008 | Cheung et al. ................ 370/236 |
| 7,554,977 | B2 | * | 6/2009  | Parizhsky et al. ............. 370/389 |
| 7,564,819 | B2 | * | 7/2009  | Khan ............................. 370/335 |

(Continued)

FOREIGN PATENT DOCUMENTS

| KR | 10-2010-0064062 A | 6/2010 |
| WO | WO-9915973 A1    | 4/1999 |
| WO | WO-2009037113 A1 | 3/2009 |

OTHER PUBLICATIONS

International Preliminary Report on Patentability, Apr. 17, 2014, The International Bureau of WIPO, PCT Patent Application No. PCT/US2011/055223.

(Continued)

*Primary Examiner* — Parth Patel
(74) *Attorney, Agent, or Firm* — Hewlett-Packard Patent Department

(57) ABSTRACT

Data transmission over a wireless connection is improved by determining whether packets include a packet containing an end of a data frame, and if the packets are determined to include such a packet, transmitting the packets together over the wireless connection.

11 Claims, 3 Drawing Sheets

(56) References Cited

U.S. PATENT DOCUMENTS

| | | | | |
|---|---|---|---|---|
| 8,392,800 | B2* | 3/2013 | Etkin | 714/774 |
| 9,014,744 | B2* | 4/2015 | Chu et al. | 455/522 |
| 2002/0114283 | A1* | 8/2002 | Lee | 370/252 |
| 2004/0072552 | A1* | 4/2004 | Park et al. | 455/334 |
| 2004/0181618 | A1* | 9/2004 | Dottling et al. | 710/33 |
| 2006/0215561 | A1* | 9/2006 | Wang et al. | 370/235 |
| 2007/0029994 | A1* | 2/2007 | Dembo | 324/158.1 |
| 2007/0064733 | A1* | 3/2007 | Osawa et al. | 370/468 |
| 2007/0115894 | A1* | 5/2007 | Herrmann et al. | 370/338 |
| 2009/0100309 | A1* | 4/2009 | Zheng | 714/748 |
| 2009/0282309 | A1* | 11/2009 | Yue et al. | 714/748 |
| 2009/0323547 | A1* | 12/2009 | Caesar et al. | 370/252 |
| 2010/0017674 | A1* | 1/2010 | Mo et al. | 714/749 |
| 2010/0039982 | A1* | 2/2010 | Itagaki et al. | 370/315 |
| 2010/0094931 | A1* | 4/2010 | Hosur et al. | 709/203 |
| 2010/0214970 | A1* | 8/2010 | Brunner et al. | 370/312 |
| 2010/0296428 | A1* | 11/2010 | Ho | 370/312 |
| 2011/0083035 | A1* | 4/2011 | Liu et al. | 714/4.1 |
| 2011/0099446 | A1* | 4/2011 | Murakami | 714/748 |
| 2012/0092443 | A1* | 4/2012 | Mauchly | 348/14.12 |
| 2012/0163354 | A1* | 6/2012 | Stacey et al. | 370/338 |

OTHER PUBLICATIONS

English Translation (machine-generated) of Abstract of Korean Patent Publication No. 10-2010-0064062A [retrieved on Feb. 27, 2014], Retrieved from the Internet: <http://worldwide.espacenet.com/publicationDetails/biblio?DB=worldwide.espacenet.com&II=0&ND=3&adjacent=true&locale=en_EP&FT=D&date=20100614&CC=KR&NR=20100064062A&KC=A>.

International Search Report and Written Opinion, Apr. 18, 2012, PCT Application No. PCT/US2011/055223.

Miu et al., Low-latency Wireless Video Over 802.11 Networks Using Path Diversity [online], IEEE ICME, Jul. 2003, Retrieved from the Internet: <http://www.google.co.in/url?sa=t&source=web&cd=3&ved=0CCcQFjAC&url=http%3A%2F%2Fciteseerx.ist.psu.edu%2Fviewdoc%2Fdownload%3Fdoi%3D10.1.1.3.3297%26rep%3Drep1%26type%3Dpdf&ei=y92_TfilOcqX8QO0mujVBQ&usg=AFQjCNHKsQPfnYjQpXiVZ_mhAtkhto1Whg> [retrieved on Feb. 27, 2014].

\* cited by examiner

COMMUNICATION OVER A WIRELESS CONNECTION

CROSS-REFERENCE TO RELATED APPLICATION

This application is a U.S. National Stage Application of and claims priority to International Patent Application No. PCT/US2011/055223, filed on Oct. 7, 2011, and entitled "COMMUNICATION OVER A WIRELESS CONNECTION".

BACKGROUND

Wireless network communication technologies enable users to travel to various places (e.g., meeting rooms, classrooms) and still have access to the Internet. As wireless technologies gain popularity, more and more time sensitive data (e.g., real-time audio/video streams) are transmitted over wireless connections.

DETAILED DESCRIPTION

The present subject matter is now described more fully with reference to the accompanying figures, in which several embodiments of the subject matter are shown. The present subject matter may be embodied in many different forms and should not be construed as limited to the embodiments set forth herein. Rather these embodiments are provided so that this disclosure will be complete and will fully convey principles of the subject matter.

It is often desirable for receiving devices (also called "receivers") of time sensitive data such as real-time audio/video streams to receive a group of data packets without delay. For example, a receiver decodes a frame in a video stream typically after receiving all packets containing data of that frame. Sending devices (also called "senders") typically arrange data transmission to optimize average throughput of wireless networks and cannot ensure that packets in a time sensitive packet group (e.g., packets of a same frame) are sent together through a wireless connection, and therefore may cause undesirable transmission delays in between the packets. Thus, a way to transmit time sensitive data over wireless connections that reduces transmission delay is desirable.

Example System Architecture

Figure 1:
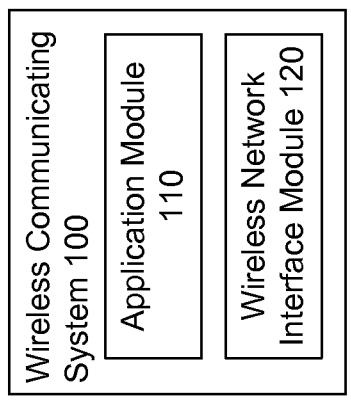
FIG. 1 is a diagram of an example architecture for a wireless communicating system.

FIG. 1 illustrates one embodiment of a system architecture for a wireless communicating system 100 that reduces transmission delay of time sensitive data in communications over wireless connections. The wireless communicating system 100 includes an application module 110 and a wireless network interface module (also called a "wireless module") 120.

The application module 110 packetizes framed data into packets and sends the packets to the wireless module 120 for transmission. Framed data are data that include multiple data frames, each of which can be processed relatively independently. Example framed data are audio/video streams that include audio/video frames. Packets containing data of a data frame form a time sensitive packet group. A wireless connection is a communication channel established between two devices in a wireless network (e.g., a WiFi network, a WiMAX network, a mobile telephone network).

In one example, the application module 110 receives a live video stream (e.g., from an on-device video camera), packetizes frames in the video stream (the data frames) into packets, and sends the packets to the wireless module 120 for transmission. The application module 110 also provides the wireless module 120 with signals about information such as whether a packet contains a data frame boundary (e.g., the packet contains an end section of a data frame, also called an "end-of-frame packet"), and whether the data in the packet are time sensitive. To signal the presence of a data frame boundary in a packet, the application module 110 may generate and send an out-of-band "end-of-frame" signal (e.g., by calling a dedicated function supported by the wireless module 120) to the wireless module 120 indicating that an end-of-frame packet has just been sent to the wireless module 120. Alternatively or additionally, the application module 110 may send the signal in-band by marking an "end-of-frame" flag (or field, bit(s)) of the packet. Similarly, the application module 110 may send an out-of-band "time sensitive" signal and/or set an in-band "time sensitive" flag to signal the wireless module 120 that a packet contains time sensitive data. The application module 110 also depacketizes packets received by the wireless module 120 and reconstructs data from these packets.

The application module 110 may generate parity packets for packets containing framed time sensitive data. A parity packet is a packet generated for a set of packets to detect and/or correct transmission errors of the set (e.g., compensating for lost packets). The parity packets can be generated using techniques such as the Forward Error Correction (FEC). Because retransmitting lost packets in a wireless network often involves regaining a right-to-transmit, which is a resource expensive operation, and the cost of generating and transmitting parity packets once the right-to-transmit has been acquired is often negligible, it may be desirable to generate and transmit parity packets to avoid retransmitting lost packets. The wireless module 120 may generate one or more parity packets for a time sensitive packet group, and include the parity packets in the group. The application module 110 may identify the parity packets to the wireless module 120 using an in-band "parity" flag and/or an out-of-band "parity packet" signal similar to end-of-frame packets. Additionally or alternatively, the application module 110 may send a signal to the wireless module 120 regarding a parity ratio for a time sensitive packet group (e.g., the ratio between the number of parity packets in the group and the group size).

The wireless module 120 receives packets from the application module 110 and transmits the packets to the intended receiver(s) over a wireless connection. In one example, the wireless module 120 implements a wireless media access control ("MAC") layer (e.g., a sub-layer of the data-link layer in the Open Systems Interconnection ("OSI") model) that implements one or more wireless protocols such as IEEE 802.11.

To reduce transmission delays of framed time sensitive data, the wireless module 120 aggregates packets as they are received from the application module 110 and transmits outstanding packets (e.g., packets received from the application module 110 and not yet transmitted out) together over a wireless connection based on factors such as the size of the outstanding packets and whether data frame boundaries exist in the outstanding packets. The wireless module 120 detects the presence of data frame boundaries in outstanding packets by determining whether any of the packets contains an end section of a data frame (e.g., according to the end-of-frame signal(s)/flag(s)). In one example, the wireless module 120 detects data frame boundaries in packets containing time sensitive data. Whether a packet contains time sensitive data can be determined by the wireless module 120 according to the time sensitive signal/flag. If the outstanding packets are determined to include data frame boundaries and/or the size of the outstanding packets exceeds a threshold value (e.g., to satisfy throughputs), the wireless module 120 transmits the outstanding packets together (e.g., in a single transmission frame such as a MAC frame) over a wireless connection. The threshold value can be determined based on factors such as the transmission rate of the wireless connection (e.g., a higher threshold value for a faster transmission rate), and can be within the range of 2 to 22. By transmitting outstanding packets including a data frame boundary without waiting for packets of subsequent data frames, the wireless module 120 may beneficially lowers communication delay for the framed time sensitive data.

To further reduce transmission delays, the wireless module 120 may generate parity packets to packets containing framed time sensitive data. As described above, the application module 110 may also generate and send parity packets to the wireless module 120. The wireless module 120 may identify parity packets in the outstanding packets based on "parity packet" signals/flags, or determine parity ratios for time sensitive packet groups. When a block acknowledgement message indicates that one or more data packets in a time sensitive packet group were lost, the wireless module 120 determines whether the parity packets are sufficient for the receiver to recover the lost packets, and retransmits those lost packets if the parity packets are insufficient for recovery. For example, if the number of lost packets for a time sensitive packet group exceeds the number of parity packets in the group, or the ratio of lost packets for the group exceeds the parity ratio of the group, then the wireless module 120 determines that the parity packets are insufficient and retransmits the lost packets.

In one example, the wireless module 120 adds parity packets if there is no backlog of outstanding packets (e.g., the size of the outstanding packets exceeds the threshold value). If the size of the outstanding packets exceeds the threshold value, then the wireless module 120 does not transmit parity packets since a right-to-transmit will be requested for transmitting the remaining backlog packets anyway, and the cost of adding retransmission of lost packets to the backlog is insignificant. The wireless module 120 (and the application module 110) can be configured to either always add parity packets or add parity packets when the size of the outstanding packets does not exceed the threshold value.

Figure 2:
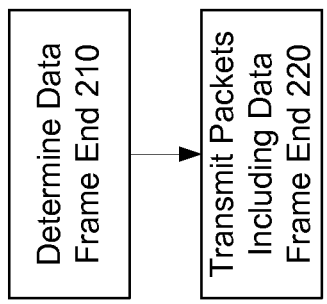
FIGS. 2 and 3 are diagrams of example methods for the system shown in FIG. 1 to reduce transmission delay of time sensitive data in communications over a wireless connection.

FIG. 2 is a flow diagram that shows an example method for the wireless module 120 to reduce transmission delay of time sensitive data in communications over wireless connections. As shown, the wireless module 120 determines that outstanding packets include a packet containing an end of a data frame in step 210, and, if the outstanding packets are determined to include a packet containing an end of the data frame (also called a data frame boundary), the wireless module 120 transmits the outstanding packets together (e.g., in a single transmission frame such as a MAC frame) over a wireless connection.

Figure 3:
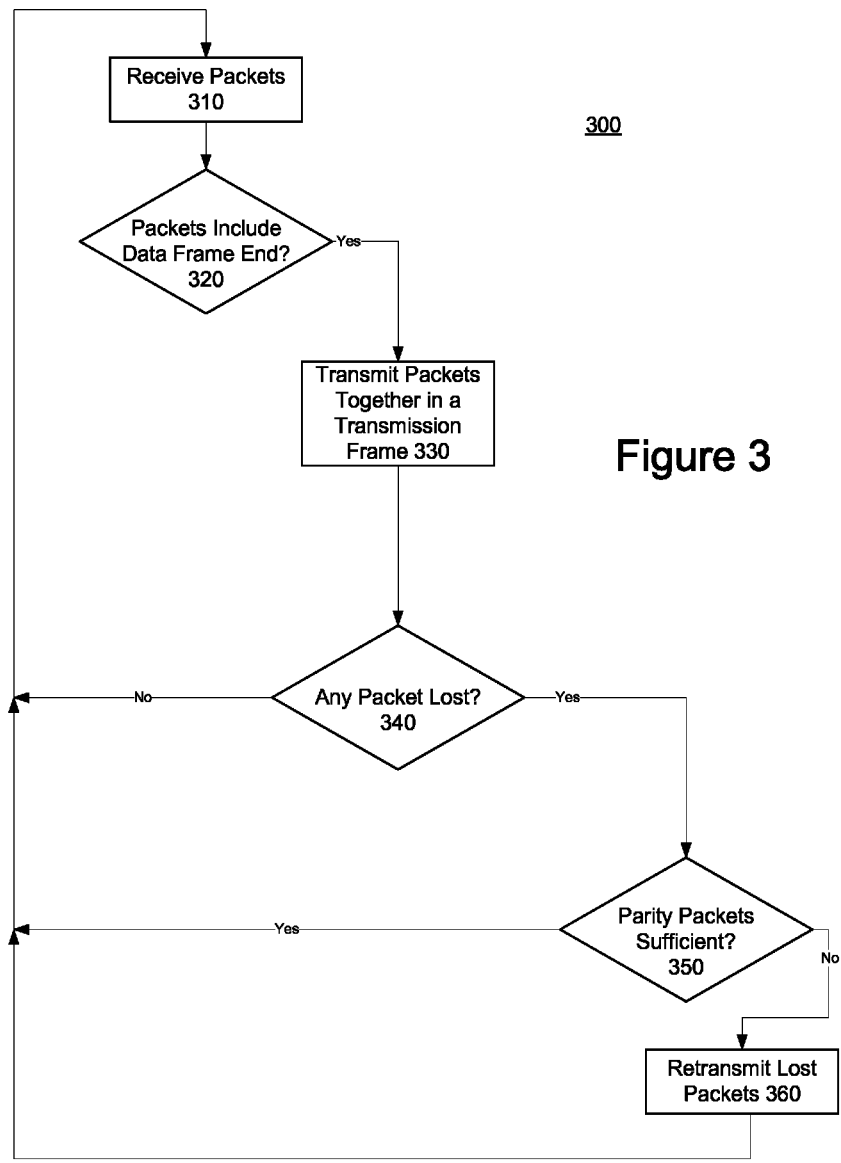

FIG. 3 is a flow diagram that shows another example method 300 for the wireless module 120 to reduce transmission delay of time sensitive data in communications over wireless connections. As shown, the wireless module 120 receives packets from the application module 110 in step 310 containing data of framed time sensitive data. The wireless module 120 may generate parity packets for the received packets and include the parity packets in the outstanding packets (e.g., if the size of the outstanding packets does not exceed the threshold value). Alternatively and/or additionally, the received packets may include parity packets generated by the application module 110 and identified using "parity packet" signals/flags. The wireless module 120 determines whether packets include data frame boundaries (e.g., by checking end-of-frame signals/flags) in step 320, and, if the packets include data frame boundaries, transmits packets together in a transmission frame over a wireless connection in step 330. If the packets do not include data frame boundaries, the wireless module 120 may decide to wait for more packets, or transmit some or all of the outstanding packets based on factors such as the size of the outstanding packets and the time spent waiting. For example, the application module 110 may packetize each frame in a high definition video stream into approximately 6 packets, generate 1 parity packet for the frame, and flag the seventh packet in the time sensitive packet group as the end-of-frame packet. The wireless module 120 receives the packets from the application module 110, detects the end-of-frame packets based on the "end-of-frame" flag, and transmits the 7 packets in each time sensitive packet group together in a MAC frame over a wireless connection.

The wireless module 120 determines whether any packet for a data frame has been lost during transmission (e.g., by analyzing a block acknowledgement message) in step 340. If no packet has been lost, then the wireless module 120 repeats the method 300 for subsequently received packets. Otherwise, if at least one packet was lost, the wireless module 120 determines in step 350 whether the transmitted parity packets are sufficient for the receiver to recover the lost packets. Continuing with the above example, if 1 of the 7 packets in a time sensitive packet group was lost, because there is 1 parity packets in the group, and the receiver can recover the lost packet using the remaining 6 packets, the wireless module 120 determines that the parity packets are sufficient for recovery. However, if 2 or more packets in the group were lost, then the wireless module 120 determines that the parity packets are insufficient for recovery. If the transmitted parity packets are determined sufficient for recovery, then the wireless module 120 does not retransmit the lost packets and repeats the method 300 for subsequent received packets. Otherwise, if the transmitted parity packets are determined insufficient, the wireless module 120 retransmits the lost packets in step 360.

The described implementations beneficially reduces transmission delay of time-sensitive data in communications over wireless connections by aggregating and transmitting packets based on presence of data frame boundaries and determining whether to retransmit lost packets based on transmitted parity packets. Because the described implementations are compatible with receivers that implements standard wireless protocols, the receivers may enjoy the reduced transmission delay without making any change.

Figure 4:
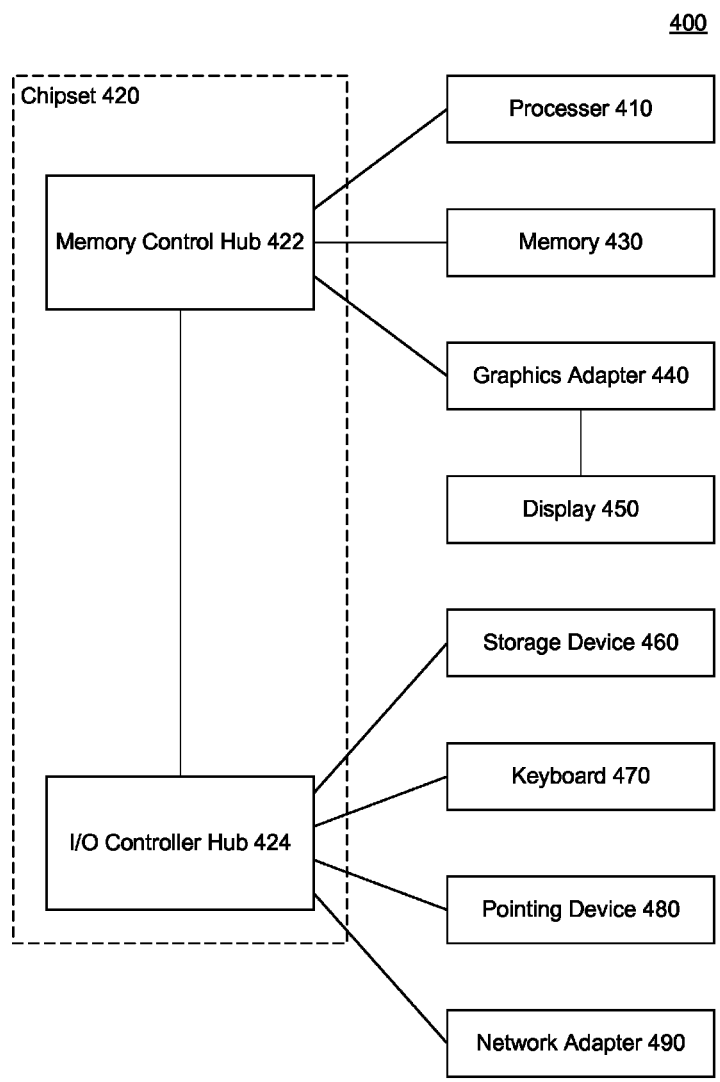
FIG. 4 is a diagram of an example computer system.

In one example, the entities shown in FIGS. 1 and 3 are implemented using one or more computer systems. FIG. 4 is a high-level block diagram illustrating an example computer system 400. The computer system 400 includes at least one processor 410 coupled to a chipset 420. The chipset 420 includes a memory controller hub 422 and an input/output (I/O) controller hub 424. A memory 430 and a graphics adapter 440 are coupled to the memory controller hub 422, and a display 450 is coupled to the graphics adapter 440. A storage device 460, a keyboard 470, a pointing device 480, and a network adapter 490 are coupled to the I/O controller hub 424. Other embodiments of the computer system 400 have different architectures.

The storage device 460 is a non-transitory computer-readable storage medium such as a hard drive, compact disk read-only memory (CD-ROM), DVD, or a solid-state memory device. The memory 430 holds instructions and data used by the processor 410. The pointing device 480 is a mouse, track ball, or other type of pointing device, and is used in combination with the keyboard 470 to input data into the computer system 400. The graphics adapter 440 displays images and other information on the display 450. The network adapter 490 couples the computer system 400 to one or more computer networks.

The computer system 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 460, loaded into the memory 430, and executed by the processor 410.

The types of computer systems 400 used by entities can vary depending upon the embodiment and the processing power required by the entity. For example, the wireless communicating system 100 might comprise a mobile telephone with limited processing power. A computer system 400 can lack some of the components described above, such as the keyboard 470, the graphics adapter 440, and the display 450.

One skilled in the art will recognize that the configurations and methods described above and illustrated in the figures are merely examples, and that the described subject matter may be practiced and implemented using many other configurations and methods. It should also be noted that the language used in the specification has been principally selected for readability and instructional purposes, and may not have been selected to delineate or circumscribe the inventive subject matter. Accordingly, the disclosure of the described subject matter is intended to be illustrative, but not limiting, of the scope of the subject matter, which is set forth in the following claims.

What is claimed is:

1. A method for transmitting a plurality of data frames over a wireless connection, comprising:
    determining whether the data frame comprises time sensitive data, and in response to determining that the data frame comprises time sensitive data:
        determining whether a plurality of packets includes a packet containing an end of a data frame, the plurality of packets including at least a portion of the data frame;
        responsive to determining that the plurality of packets includes a packet containing an end of the data frame, generating at least one parity packet for the plurality of packets including framed time sensitive data;
        transmitting the at least one parity packet along with the plurality of packets together over the wireless connection;
        receiving a message from a receiver indicating that at least one of the plurality of packets was not transmitted successfully;
        determining whether the transmitted at least one parity packet is sufficient for the receiver to recover the at least one of the plurality of packets that was not transmitted successfully;
        in response to determining that the transmitted at least one parity packet is sufficient for the receiver to recover the at least one of the plurality of packets that was not transmitted successfully, not retransmitting the at least one of the plurality of packets that was not transmitted successfully; and
        in response to determining that the transmitted at least one parity packet is not sufficient for the receiver to recover the at least one of the plurality of packets that was not transmitted successfully, retransmitting the at least one of the plurality of packets that was not transmitted successfully.

2. The method of claim 1, wherein transmitting the at least one parity packet along with the plurality of packets together over the wireless connection comprises transmitting the at least one parity packet and the plurality of packets in a transmission frame over the wireless connection.

3. The method of claim 1, wherein generating the at least one parity packet further comprises generating the at least one parity packet responsive to a predetermined value exceeding a size of the plurality of packets.

4. The method of claim 1, further comprising:
    responsive to a size of the plurality of packets exceeding a predetermined value, transmitting the plurality of packets together over the wireless connection.

5. The method of claim 1, further comprising receiving at least one of:
    an out-of-band, end-of-frame signal, wherein determining whether a plurality of packets includes a packet containing an end of a data frame comprises identifying the out-of-band, end-of-frame signal; and
    an out-of-band, time sensitive signal to signal receipt of a packet comprising the time sensitive data.

6. A non-transitory computer-readable storage medium having instructions recorded thereon, which when executed by a computer, cause the computer to:
    determine whether the data frame comprises time sensitive data, and in response to a determination that the data frame comprises time sensitive data:
        determine whether a plurality of packets includes a packet containing an end section of a data frame, the plurality of packets including at least a portion of the data frame;
        responsive to a determination that the plurality of packets includes a packet containing an end section of a data frame, generate at least one parity packet for the plurality of packets including framed time sensitive data;
        transmit the at least one parity packet along with the plurality of packets together over a wireless connection;
        receive a message from a receiver indicating that at least one of the plurality of packets was not transmitted successfully;
        determine whether the transmitted at least one parity packet is sufficient for the receiver to recover the at least one of the plurality of packets that was not transmitted successfully;
        in response to a determination that the transmitted at least one parity packet is sufficient for the receiver to recover the at least one of the plurality of packets that was not transmitted successfully, not to retransmit the at least one of the plurality of packets that was not transmitted successfully.

7. The non-transitory computer-readable storage medium of claim 6, wherein the instructions are to generate the at least one parity packet for the plurality of packets responsive to a predetermined value exceeding a size of the plurality of packets.

8. The non-transitory computer-readable storage medium of claim 6, wherein the instructions are further to cause the computer to detect at least one of:
- an out-of-band, end-of-frame signal, wherein determining whether a plurality of packets includes a packet containing an end section of a data frame comprises detecting the out-of-band, end-of-frame signal; and
- an out-of-band, time sensitive signal to identify receipt of a packet comprising the time sensitive data.

9. A wireless communicating system for transmitting a plurality of data frames over a wireless connection, comprising:
- an application module to generate a plurality of packets including at least a portion of a data frame comprising time sensitive data; and
- a wireless module to determine whether the data frame comprises time sensitive data, and in response to a determination that the data frame comprises time sensitive data:
  - determine whether the plurality of packets includes a packet containing an end of the data frame;
  - responsive to a determination that the plurality of packets includes a packet containing an end of the data frame, generate at least one parity packet for the plurality of packets including framed time sensitive data;
  - transmit the at least one parity packet along with the plurality of packets together over the wireless connection to a receiver;
  - receive a message from the receiver indicating that at least one of the plurality of packets was not transmitted successfully;
  - determine whether the transmitted at least one parity packet is sufficient for the receiver to recover the at least one of the plurality of packets that was not transmitted successfully;
  - in response to a determination that the transmitted at least one parity packet is sufficient for the receiver to recover the at least one of the plurality of packets that was not transmitted successfully, not retransmit the at least one of the plurality of packets that was not transmitted successfully; and
  - in response to a determination that the transmitted at least one parity packet is not sufficient for the receiver to recover the at least one of the plurality of packets that was not transmitted successfully, retransmit the at least one of the plurality of packets that was not transmitted successfully.

10. The wireless communicating system of claim 9, wherein the application module is to generate at least one of:
- an out-of-band, end-of-frame signal, and wherein to determine whether the plurality of packets includes a packet containing an end of a data frame, the wireless module is further to identify the out-of-band, end-of-frame signal; and
- an out-of-band, time sensitive signal, and wherein the wireless module, responsive to a determination that the plurality of packets includes a packet containing an end of the data frame, is to generate at least one parity packet for the plurality of packets responsive to a detection of the out-of-band, time sensitive signal.

11. The wireless communicating system of claim 9, wherein the application module is further to:
- generate parity packets for packets of the plurality of packets including the framed time sensitive data, and
- identify the application module generated parity packets to the wireless module using at least one of an in-band parity flag and an out-of-band parity packet signal.

* * * * *

UNITED STATES PATENT AND TRADEMARK OFFICE
CERTIFICATE OF CORRECTION

Page 1 of 1

PATENT NO. : 9,264,939 B2
APPLICATION NO. : 14/345268
DATED : February 16, 2016
INVENTOR(S) : Andrew J. Patti et al.

It is certified that error appears in the above-identified patent and that said Letters Patent is hereby corrected as shown below:

In the Drawings

In sheet 3 of 3, reference numeral 410, line 1, delete "Processer" and insert -- Processor --, therefor.

Signed and Sealed this
Second Day of August, 2016

Michelle K. Lee
*Director of the United States Patent and Trademark Office*